Patented Nov. 6, 1923.

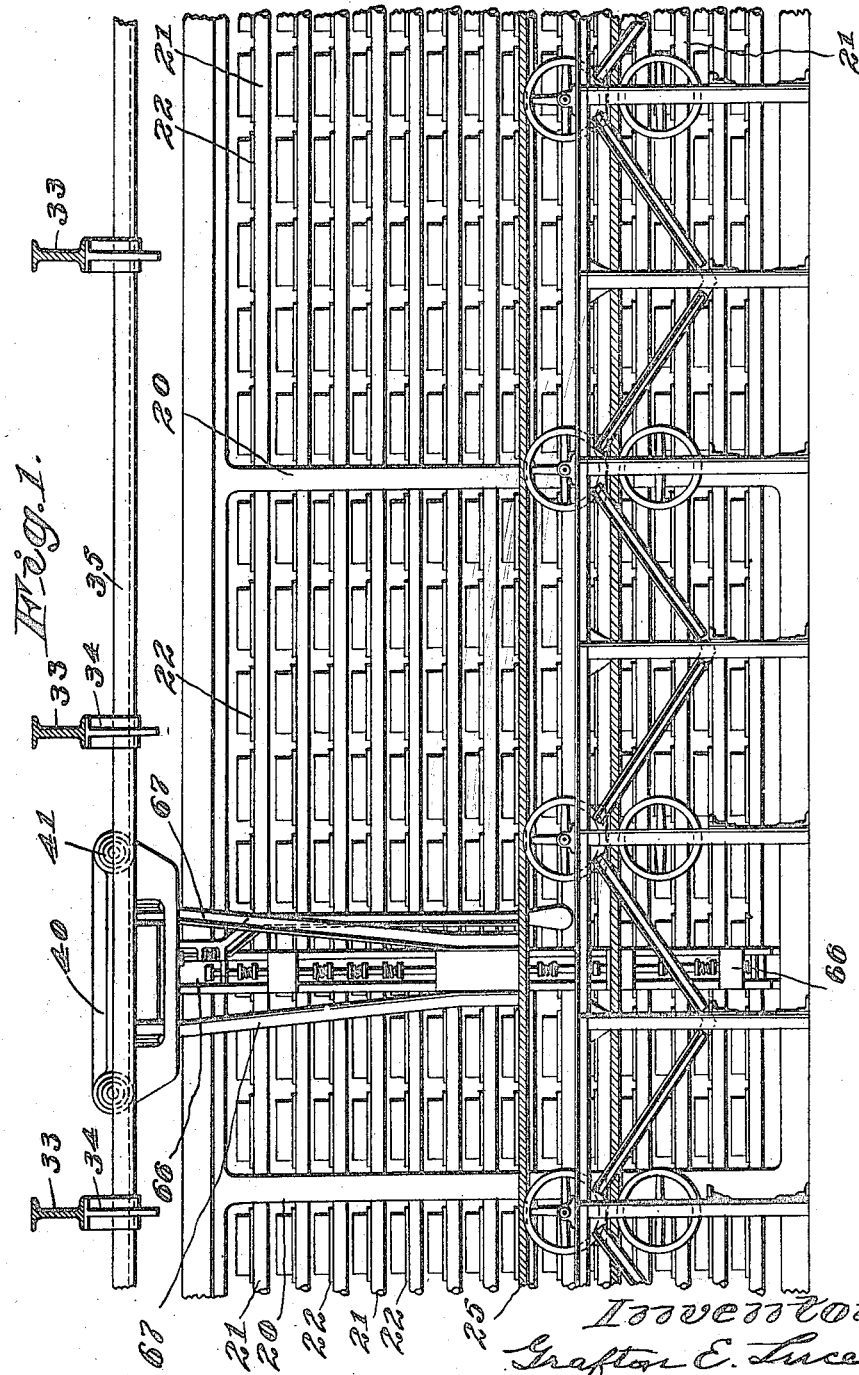

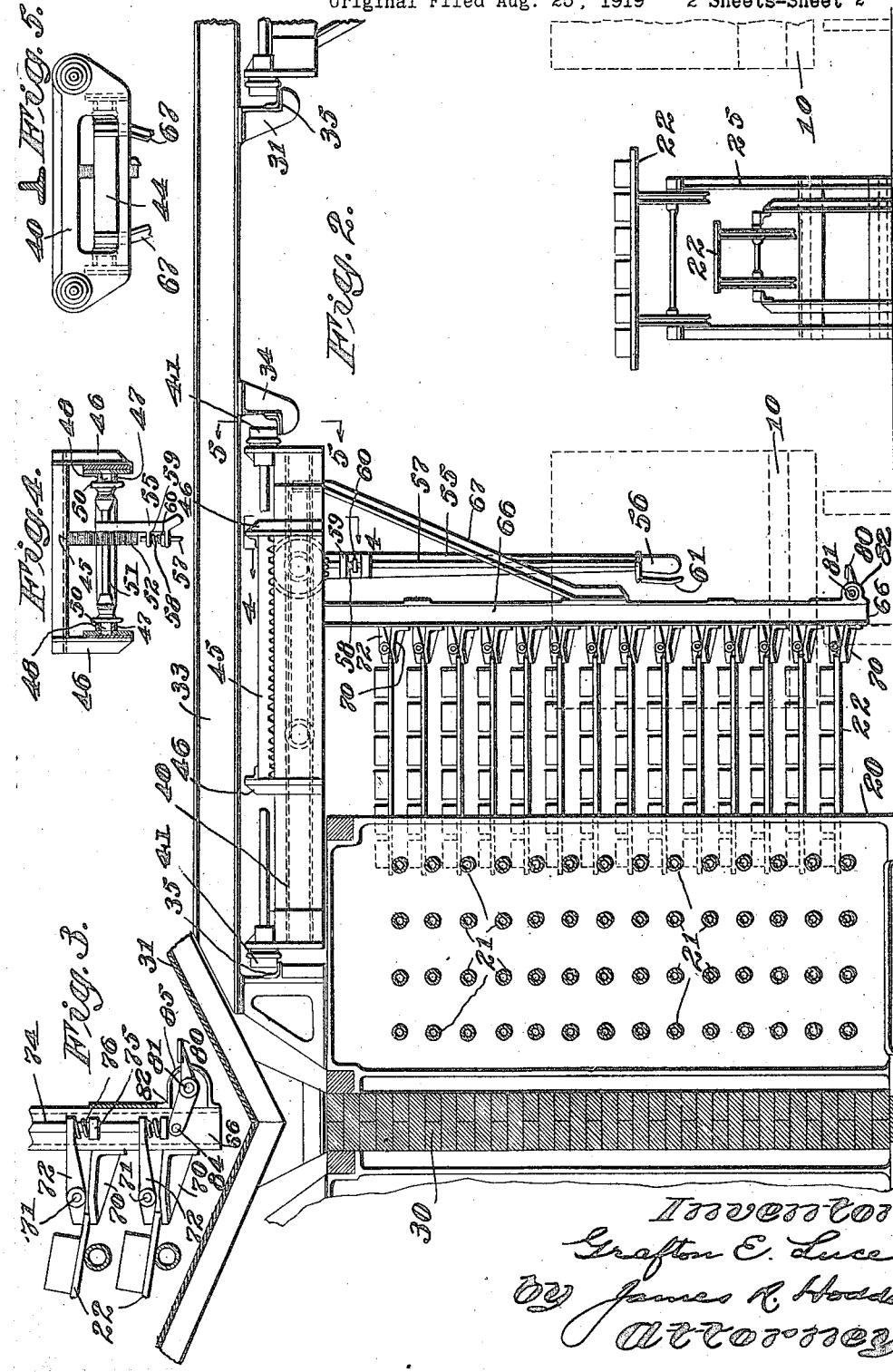

1,473,305

UNITED STATES PATENT OFFICE.

GRAFTON E. LUCE, OF CHICAGO, ILLINOIS, ASSIGNOR TO AMERICAN EQUIPMENT COMPANY, OF CHICAGO, ILLINOIS, A CORPORATION OF OHIO.

BRICK-PALLET-HANDLING APPARATUS.

Original application filed August 25, 1919, Serial No. 319,707. Divided and this application filed March 2, 1920. Serial No. 362,649.

*To all whom it may concern:*

Be it known that I, GRAFTON E. LUCE, a citizen of the United States, and resident of Chicago, in the county of Cook and State of Illinois, have invented an Improvement in Brick-Pallet-Handling Apparatus, of which the following description, in connection with the accompanying drawings, is a specification, like letters on the drawings representing like parts.

My present invention is apparatus intended to be used in connection with the pallet system of brick manufacture, and is a division of my prior application Ser. No. 319,707, filed August 25, 1919. In the present case I have illustrated, described and claimed my novel apparatus for use in removing the green brick from pallets on which they have been placed for drying, and for holding the pallets while loading the brick onto a drier car. To this end my apparatus consists in movable devices, preferably swung from an overhead track and capable of being moved longitudinally of the drier, stopped at any position, with readily operable means thereon to engage, grasp and pull out a plurality of pallets simultaneously, supporting and holding these pallets in removed or partially removed position until the brick are taken therefrom. Further features of the invention consist in automatic means to effect a firm grip on each pallet engaged by the apparatus; means to automatically compensate for variations in height of the pallets; means to so grip the pallets as to bring the principal pressure on the outer pipe of the rack, thus simplifying removal; and means to limit the outward pallet pulling movement, so as to hold the same in substantially predetermined position.

Other features of the invention, novel combinations of parts and advantages will be more fully hereinafter pointed out and claimed.

Fig. 1 is a fragmentary longitudinal view of a steam pipe rack drier of standard type showing the drier as equipped with the rope conveyor and with my "pallet puller and holder" novel type of apparatus for use in unloading the brick from the steam pipe racks onto the cars.

Fig. 2 is a fragmentary cross-sectional view of the steam pipe rack drier shown illustrating the pallet puller and holder operating to support the pallets in convenient position for unloading the brick from the pallets onto the drier car;

Fig. 3 is a fragmentary view on an enlarged scale illustrating the method of gripping the end of the pallets;

Fig. 4 is a fragmentary view on the line 4—4 of Fig. 2;

Fig. 5 is a detailed view on the line 5—5 of Fig. 2.

My present apparatus or "pallet puller" is intended for use in carrying out the method of handling described in my said prior application, but is not limited thereto, and is useful and of benefit in handling pallets of brick or the like in connection with other methods and other articles.

The use of my apparatus, however, in connection with the method of handling as explained in said prior case and particularly in accordance with the usage generally employed in the so-called Hudson River district, enables special advantages to be obtained. Thus it is possible to turn brick on edge, to flatten one edge, when handling green brick, and thereby secure more brick on a pallet, if desired. Also, in unloading the brick from the pallet, it is feasible to stack the brick on a drier car, specially adapted to receive the pallets endwise, if so desired. Various other advantages of my present apparatus will readily occur to those skilled in the art.

Referring to Figs. 1 and 2 wherein a steam pipe rack drier is illustrated, I have shown a drier of well-known type comprising a plurality of pipe supports or standards 20, the steam pipes being arranged in series to form shelves, as shown at 21, 21. These steam pipe racks receive the pallets 22 lengthwise of the pallets for the depth of the pipe racks, thus presenting the end pallet toward the operator. It is usual in loading brick into a steam pipe rack drier to employ a rope conveyor, as indicated in Figs. 1 and 2 at 25, this being shown in conventional form, the pallets 22 carrying the brick being brought into the drier on the uppermost pairs of ropes and wheels and the empty pallets being set back on the return ropes and wheels—as clearly shown in the drawings. These conveyors are fitted within the driers and operated during the loading of the green brick into the drier at which time the empty pallets from the preceding load are returned. Heretofore it has been customary to use wheel barrows or other types of trucks to receive the green brick when unloaded from this type of drier, the operator drawing out a pallet by hand, supporting its entire weight, resting one end of the pallet on the car or wheel barrow, tilting up the other end and letting the entire number of brick on the pallet slide off onto the wheel barrow or truck, then replacing the pallet and repeating this process. My invention however enables a much simpler process to be utilized to load the brick directly from the pallet onto the car 10 enabling the operator to pile up the brick in desired formation on the car 10 from a steam pipe rack drier as well as from the former driers. For this purpose I have devised a "pallet puller and holder" which will now be described. It will be appreciated that with a car 10 in the drier, it would be difficult for the operator to draw out a pallet of brick when the same are endwise, as in a steam pipe rack drier, and both hold the pallet with its load of brick and transfer the brick therefrom onto the car.

Since steam pipe rack driers are substantially permanent buildings having substantially partitioned walls 30 and permanently constructed roofs 31, I apply a suitable number of cross bars 33 which may be utilized to advantage in the ordinary construction of the drier or may be applied to existing driers. On these cross bars, hangers 34 are fitted at suitable spaces which receive tracks 35. A crane 40 having a pair of flanged wheels 41, 41 on each track 35 and spaced to span the distance between said tracks has a traveling carriage 44 which is adapted to traverse the crane 40. Fixed on the crane 40 is a rack 45 secured to a pair of brackets 46, 46, the latter carrying angle irons 47, 47, and 48, 48, constituting tracks for the wheels 50 of the carriage 44. On the axle 51 of one pair of the carriage wheels 50 is keyed a gear wheel 52 approximately central and in position to mesh with the rack 45. Pivoted onto the axle 51 is a handle bar 55 extending downwardly and preferably laterally sufficiently to clear the width of a tier of pallets, this handle bar being provided with a handle bar 56. Within convenient reach of the operator and pivotally mounted on the handle bar 55 is a handle lever 61 to which is pivotally attached the lower end of a rod 57 adapted to extend into and mesh with one of the teeth in the gear 52 but normally held out of mesh by a coiled spring 58 bearing between the guiding lug 59 and a collar 60 on said rod. The operator upon grasping the handle 56 may also grasp the lever 61 and force the rod 57 upward against the tension of the spring 58 and into engagement with the rack bar, then swinging the handle forwardly and backwardly and thus move the entire carriage and its pallet supporting means (to be described) transversely of the crane. A few manipulations in this manner will readily move the carriage forwardly or backwardly. Secured to the carriage 44 is a downwardly extending member 66 preferably made of two channel beams united by a plate and cross members and braced by a pair of braces 67, 67 extending from the carriage 44 downwardly to the member 66 substantially as shown in Figs. 1 and 2.

On this member 66 is mounted a plurality of brackets 70 70, each carrying upstanding lug to which is pivoted at 71 a jaw 72; this jaw preferably extends forwardly to cooperate with the outermost end of the bracket member 70 and also extends rearwardly with a bored recess to encircle a rod 74. Secured to the rod 74 adjacent each jaw 72 is a collar 75 and a coiled spring 76, encircling the rod 74, bears beween the collar 75 and the adjacent portion of the jaw 72 but only when the rod 74 is under tension to close the jaws, then this spring gives an independently yielding and substantially a uniform grip for each and all of the jaws. To thus actuate these jaws simultaneously, I provide a foot lever 80 pivoted at 81 to a lug 82 arranged at the lowermost end of the member 66 and having the other end of said lever pivotally secured at 84 to the end of the rod 74, a rack 85 adapted to cooperate with the toothed edge of the lever 80 is also provided so that the operator on pressing downwardly on the foot treadle 80 and swinging the same slightly over against the rack 75 may depress the same and hold the rod 74 elevated in any desired position, thus applying proper gripping and holding tension to all the jaws 72. These jaws are substantially in alinement with the pipe racks formed by the pipes 21 and the jaws opened sufficiently to allow for any reasonable inequalities in height of the pallets 22 as the same rest upon the pipe 21. In the operation of this apparatus, when the car 10 has been run into the steam pipe rack drier for loading, the operator moves the crane 40 on its wheels and tracks until the member 66 and its line of jaws are in position opposite the ends of a tier of pallets which it is desired to pull out and from which the brick are to be removed onto the drier car. It will be understood that the pallets are all normally resting on the rack pipe 21 and therefore substantially within the frames 20 of the steam pipe rack drier. On a few manipulations of the lever 57 the carriage 44 is then moved inwardly until the jaws 72, which are then opened, are in position to engage the projecting edges of the pallets 22;—thereupon the operator applies pressure to the foot treadle 80 thus simultaneously actuating all the jaws 72 to grasp the adjacent jaw portions of the pallets in position. It is customary to have these pipe rack driers of about fourteen tiers in height and accordingly fourteen pairs of jaws would be provided, suitably spaced. I find it desirable to arrange the jaws so that, when the jaws 72 are closed upon the cooperating bracket member 70, a tendency to slightly incline the pallets 22, lifting the rearmost portions and resting the same substantially on the outermost pipe 21—as shown in Fig. 3—will facilitate the withdrawing of the pallets from the rack to the position shown in Fig. 8. To effect this withdrawal, the operator also manipulates the lever 57 in reverse direction so that the gear 52 will move the carriage 44 along the rack 45, the entire carriage and pallet puller and supporter is thus drawn out into the passageway adjacent the car 10 and with each brick on each pallet within convenient reach of the operator to grasp the brick and unload same from the pallets onto the drier car, building up the brick on the drier car in hacked relation or formation. Thus the utilization of my apparatus, just explained, positions and holds the pallets in a steam pipe rack drier in a convenient location for the operator. I contemplate the employment of two operators loading the car 10 from each end when unloading from a steam pipe rack drier, as just explained. Furthermore when a plurality of cars are to be loaded, I contemplate the operators taking only alternate tiers of pallets, leaving the other tiers for the successive unloading operation of the second operator as the cars are moved forwardly from time to time and the racks unloaded.

My invention is further described and defined in the form of claims as follows:

1. Apparatus of the kind described, comprising a movable support, a plurality of clamps carried by said support, said clamps being spaced approximately equal to the distance between the pallet receiving pipes in a steam pipe drier, and means for moving the clamps to engage and hold a plurality of pallets under substantially equivalent holding tension.

2. Apparatus of the kind described comprising a movable support, an overhead traveling carriage to which said support is attached, a plurality of clamps arranged vertically on said support, said clamps having pallet engaging jaws and being spaced approximately equal to the standard sized pipe rack driers on which brick-carrying pallets are placed, said clamps being adapted to normally open a considerable scope to allow for inequalities in the spacing and height of the pallets and clamps, in combination with means to move the carriage transversely and longitudinally, together with means to engage said pallets by the clamps, and to disengage said pallets, at will.

3. Apparatus of the kind described comprising a transverse and longitudinally movable carrier, a depending support, a plurality of clamps on said support, an operating handle having means to move the carriage and support and lock it in position where moved, clamping and unclamping means to actuate the clamps simultaneously and a foot treadle to actuate said clamping and unclamping means.

4. Apparatus of the kind described comprising a transverse and longitudinally movable carrier, a depending support, a plurality of clamps on said support, an operating handle having means to move the carriage and support and lock it in position where moved, a rod extending adjacent the clamps, each clamp having a movable jaw extending adjacent said rod, collars on the rod adjacent each jaw and yielding means between said collars and jaw extension, in combinaton with a foot treadle to move the rod and close all of said clamps yieldingly.

5. Apparatus of the kind described, comprising clamping means to engage one end of a pallet while in a pipe rack drier, and means to operate said clamping means and to simultaneously produce a tilting action on the pallet when clamped, to facilitate withdrawing the pallet by outward movement of the clamp, causing the pallet to rest on the outermost edge of the pipe rack support.

In testimony whereof, I have signed my name to this specification.

GRAFTON E. LUCE.